US 9,002,095 B2

(12) United States Patent
Argue et al.

(10) Patent No.: US 9,002,095 B2
(45) Date of Patent: Apr. 7, 2015

(54) FAULTY CART WHEEL DETECTION

(71) Applicants: Stuart Argue, Palo Alto, CA (US); Anthony Emile Marcar, San Francisco, CA (US)

(72) Inventors: Stuart Argue, Palo Alto, CA (US); Anthony Emile Marcar, San Francisco, CA (US)

(73) Assignee: Wal-Mart Stores, Inc., Bentonville, AR (US)

(*) Notice: Subject to any disclaimer, the term of this patent is extended or adjusted under 35 U.S.C. 154(b) by 169 days.

(21) Appl. No.: 13/723,117

(22) Filed: Dec. 20, 2012

(65) Prior Publication Data

US 2014/0177907 A1 Jun. 26, 2014

(51) Int. Cl.
G06K 9/00 (2006.01)
G06T 7/00 (2006.01)

(52) U.S. Cl.
CPC .............. G06T 7/0002 (2013.01); G06K 9/00 (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 3,976,999 A | 8/1976 | Moore | |
| 3,992,710 A | 11/1976 | Gabriele | |
| 4,243,972 A | 1/1981 | Toussaint | |
| 4,497,065 A | 1/1985 | Tisdale | |
| 4,881,270 A | 11/1989 | Knecht | |
| 4,906,940 A | 3/1990 | Greene | |
| 5,068,664 A | 11/1991 | Appriou | |
| 5,233,541 A | 8/1993 | Corwin | |
| 5,258,924 A | 11/1993 | Call | |
| 5,524,845 A | 6/1996 | Sims | |
| 5,640,468 A | 6/1997 | Hsu | |
| 6,118,886 A | 9/2000 | Baumgart | |
| 6,597,800 B1 | 7/2003 | Murray | |
| 6,928,189 B2 | 8/2005 | Hemiari | |
| 6,944,342 B1 | 9/2005 | Stahl | |
| 8,150,101 B2 | 4/2012 | Haanpaa | |
| 2006/0244588 A1* | 11/2006 | Hannah et al. | 340/539.13 |
| 2007/0045018 A1* | 3/2007 | Carter et al. | 180/167 |
| 2008/0158013 A1* | 7/2008 | Nebolon et al. | 340/988 |
| 2009/0244390 A1* | 10/2009 | Feris et al. | 348/701 |
| 2009/0268941 A1* | 10/2009 | French et al. | 382/103 |
| 2011/0128150 A1* | 6/2011 | Kanga et al. | 340/541 |
| 2011/0316697 A1* | 12/2011 | Krahnstoever et al. | 340/540 |

OTHER PUBLICATIONS

Kevin Smith, Pedro Quelhas, and Daniel Gatica-Perez. "Detecting Abandoned Luggage Items in a Public Space" PET, 2006, hereinafter Smith.*

* cited by examiner

*Primary Examiner* — Jon Chang
*Assistant Examiner* — Oneal R Mistry
(74) *Attorney, Agent, or Firm* — Howard & Howard Attorneys PLLC

(57) ABSTRACT

A system and method of identifying carts exhibiting tendencies that are indicative of damaged or defective wheels. A shopping cart may be identified and tracked visually through one or more surveillance cameras. By comparing the cart's tracked movement to known symptomatic movement patterns, the system may identify defective or damaged carts. Alternatively, by analyzing movement and positioning of a cart's swiveling wheels, the system may identify defective or damaged carts. Alternatively, by identifying if a customer has abandoned a cart, the system may identify defective or damaged carts. A notification message may be transmitted to an associate to repair or replace the identified problematic cart. The notification may be displayed on a mobile computing device, a workstation, or other like systems.

17 Claims, 4 Drawing Sheets

FAULTY CART WHEEL DETECTION

RELATED APPLICATIONS

This application is related to U.S. application Ser. No. 13/723,017, filed Dec. 20, 2012 and U.S. application Ser. No. 13/723,137, filed Dec. 20, 2012. The application is incorporated herein by reference for all purposes.

BACKGROUND

Shopping carts, also known as shopping trolleys in certain countries, are ubiquitous implements in many types of retailers, particularly grocery stores. Shopping carts are typically provided to customers by retail establishments to increase the customers' convenience and encourage return shopping visits and increased shopping activity. Carts may typically have four or more wheels. Many carts have swivel wheels at the front and non-swiveling rear wheels. Other carts have four swiveling wheels.

Over time and/or due to damage, wheels on carts may become stuck so that they exhibit increased spinning or swiveling resistance. Additionally, damaged swiveling wheels may develop wobble, which generally defined as sustained oscillation of the swiveling wheels. Such damage or defects may increase the amount of effort expended by a person trying to push or pull the cart. A cart with such damage or defects may have a tendency to veer to one side or may not easily turn in one or both directions. Such problematic carts may cause user frustration and decrease user comfort, which can discourage customers from returning to the establishment.

What is needed, therefore, is a system for identifying carts that exhibit symptoms of damaged or defective wheels and for notifying an associate to remove from circulation and potentially remove or replace the problematic carts.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
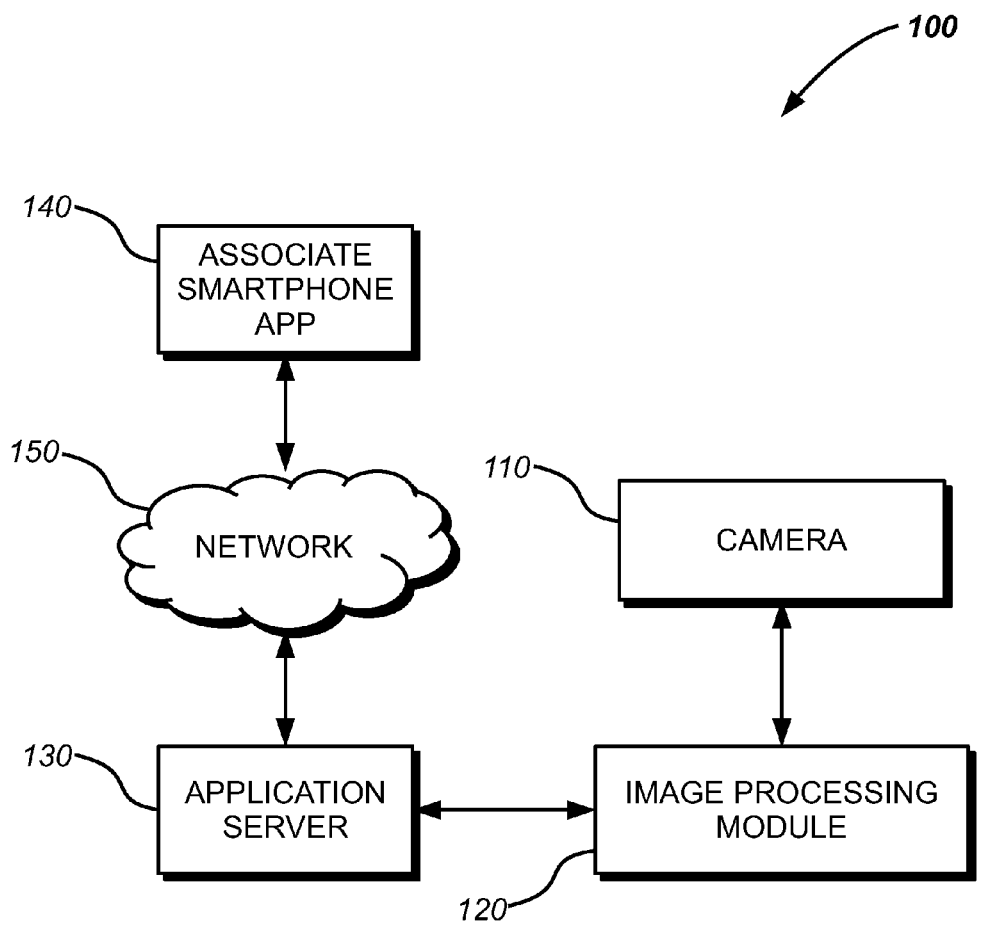
FIG. 1 is a schematic block diagram of a faulty wheel detection system according to one embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowchart and block diagrams in the attached figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Embodiments of the present disclosure comprise methods and systems that allow retail or other establishments to automatically detect defective and/or damaged cart wheels or casters by visually tracking and analyzing movement patterns followed by the cart. Embodiments include one or more cameras and an image processing module adapted to identify and track movement of a cart. If a cart's movement follows a pattern known to be symptomatic of a defective wheel or caster, an alert may be created and transmitted to an associate to remove the problematic cart from use and/or repair or replace the defective part.

With reference to FIG. 1, faulty wheel detection system 100 comprises camera 110, image processing module 120, and application server 130. In embodiments, camera 110 comprises multiple security or surveillance cameras, such as those typically installed on a ceiling or wall at retail, commercial, and industrial establishments. In other embodiments, camera 110 comprises other means capable of capturing still and/or video images. In embodiments, camera 110 is adapted to swivel, pan, and otherwise direct its image-capturing apparatus.

Image processing module 120 comprises circuitry, a processor and computer-readable instructions in the form of software stored in a memory, combinations thereof, or the like adapted to identify and track objects in images captured by camera 110 as described herein. Image processing module 120 is adapted to transmit a signal to application server 130 upon recognition of certain patterns or behaviors in target objects. Image processing module 120 can identify objects in the images captured by camera 110 as carts and track each cart's location as it moves within the view of one or more cameras 110. Image processing module 120 may include known visual recognition and image processing software and/or hardware techniques to distinguish between carts, people, and other objects in each image. Image processing module 120 can link sequential images from camera 110 and track an identified cart's movement through the sequence.

In embodiments, image processing module 120 can detect what type of damage or defect is afflicting a cart. For example, if a cart exhibits a tendency to pull to the left, a problem with the left front wheel may be indicated. If certain movement patterns are symptomatic of a front wheel that has an increased resistance to swiveling, such a problem can be identified by the image processing module 120.

Application server 130 comprises circuitry, a processor and computer-readable instructions in the form of software stored in a memory, combinations thereof, or the like adapted to receive a signal from image processing module 120 regarding image analysis and transmit an alert to an associate smartphone application 140. Data transmitted by application server 140 may include data regarding movement patterns tracked by image processing module 120. For example, data transmitted by application server 130 may include a last-known location of a cart. Additional data may include data related to the type of damage or defect detected, such as which wheel may be damaged and possible corrective measures.

Application server 130 is adapted to receive data from image processing module 120 and create an alert to transmit to associate smartphone app 140 over network 150. An alert may include a last-known location of the identified cart, details of the cart, an image of the customer using the cart, and a suggested course of action to remove the cart from use and/or repair the cart. An alert may be presented as a notification within a graphical user interface of a smartphone app 140 used generally for management functions within a retail store or other establishment. In alternative embodiments, an alert is transmitted to a workstation, for example an onsite, offsite, and/or back office computer workstation. In other embodiments, an alert is transmitted to a mobile device. A mobile device may comprise a smartphone, a personal digital assistant, Wi-Fi mobile device, or other type of mobile computing device.

Smartphone app 140 comprises software, hardware, and/or memory in a mobile computing device in communication with application server 130 via network 150. Smartphone app 140 is adapted to display an alert to an associate in response to receiving the alert from application server 140. In embodiments, an associate may request additional information through smartphone app 140. In alternative embodiments, network 150 comprises any communication network including, but not limited to: a wireless network, a cellular network, an intranet, the Internet, or combinations thereof.

Figure 2:
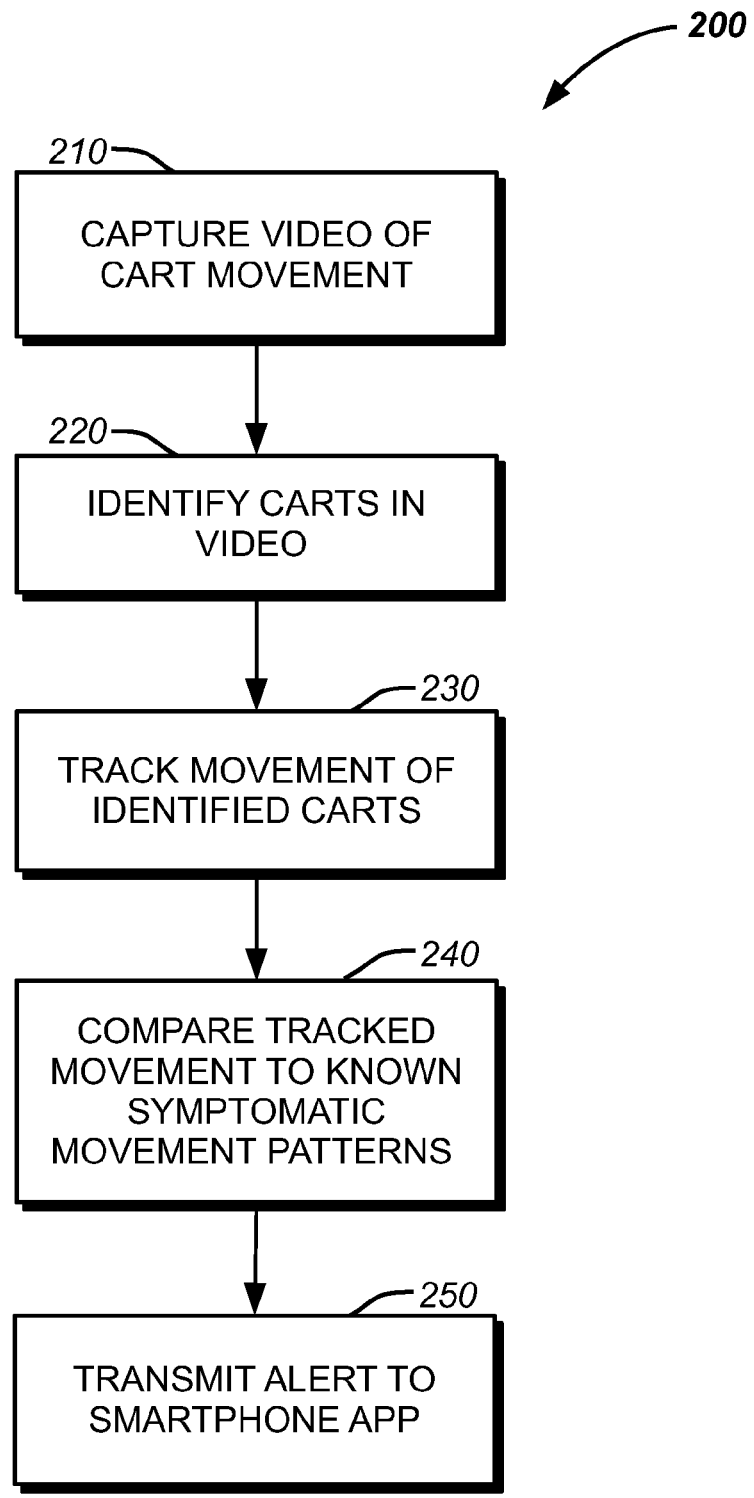
FIG. 2 is a flowchart illustrating an exemplary method of detecting a faulty cart wheel.

In operation, faulty wheel detection system 100 is adapted to capture video or image sequences, identify a cart appearing in the video or images, track the cart's movement and/or related behavior, identify carts having faulty, defective, or damaged wheels or casters, and notify an associate for corrective action. Referring now to FIG. 2, embodiments of the present disclosure comprise method 200. At operation 210, camera 110 captures video or a sequence of images depicting a cart. In embodiments, the cart is a grocery cart pushed by a customer while shopping in a grocery store.

At operation 220, image processing module 120 receives images from camera 110 and identifies if any carts are depicted therein. At operation 230, image processing module 120 tracks the movement of any identified carts or like objects. In embodiments, image processing module 120 is adapted to identify the orientation of each identified cart (i.e., which end of the cart is the front and which is the rear). Tracking cart movement may be accomplished over multiple cameras 110 feeding images into image processing module 120. Coordination between multiple cameras 110 may be managed by image processing module 120 to follow an object as it passes between zones covered by respective cameras 110. Image processing module 120 may transmit instructions to cameras 110 to aim at specific coordinates, zoom level, and the like to optimize tracking of carts and other objects.

At operation 240, image processing module 120 compares a cart's tracked movement to known patterns that are symptomatic of defective or damaged wheels. Such movement patterns may typically be caused by a defective wheel, which may cause a cart to favor one direction, exhibit unsteady behavior, or otherwise follow patterns indicative of damaged or defective cart wheels. Image processing module 120 can compare observed movement patterns against known movement patterns that are symptomatic of damaged or defective cart wheels. In embodiments, the observed pattern is assigned a match score based on how similar it is to a known symptomatic movement pattern. In an embodiment, a score threshold is implemented, such that if an observed movement pattern receives a match score above the threshold, the observed movement is deemed a match and indicative of a damaged or defective cart wheel.

In embodiments, image processing module 120 tracks a cart's path by locating an approximate visual centroid of the cart and tracking the movement of the centroid over time. Alternatively, image processing module 120 may track both the centroid and the cart's facing direction. In alternative embodiments, image processing module 120 identifies and tracks the cart's edges and/or corners.

Upon identifying a cart with one or more suspected defective wheels, image processing module 120 transmits a signal to application server 130 regarding the identified problematic cart. In embodiments, the transmitted signal includes identifying information for the cart and/or person using the cart. For example, image processing module 120 may transmit an image depicting the cart and/or the customer using the cart to application server 130.

At operation 250, application server 130 creates an alert corresponding to the identified shopping cart and transmits the alert to an associate. The alert may instruct the associate to remove the cart from use and/or place the cart in a repair queue. In an embodiment, the alert includes an image of a grocery store customer pushing the identified defective cart and/or the cart's last known location so that an associate can find the cart in the store and trade the cart out for a functional cart. In another embodiment, an alert is transmitted to a cashier upon the customer arriving at the cashier so that the cashier can compensate the customer for the inconvenience of the defective shopping cart.

After identifying and creating an alert for a problematic cart, corrective action may be effected on the identified cart. In embodiments, an associate removes the cart having a suspected defective wheel from active use so that another customer will not receive and use that cart. In alternative embodiments, an order to repair the identified cart may be issued.

Figure 3A:
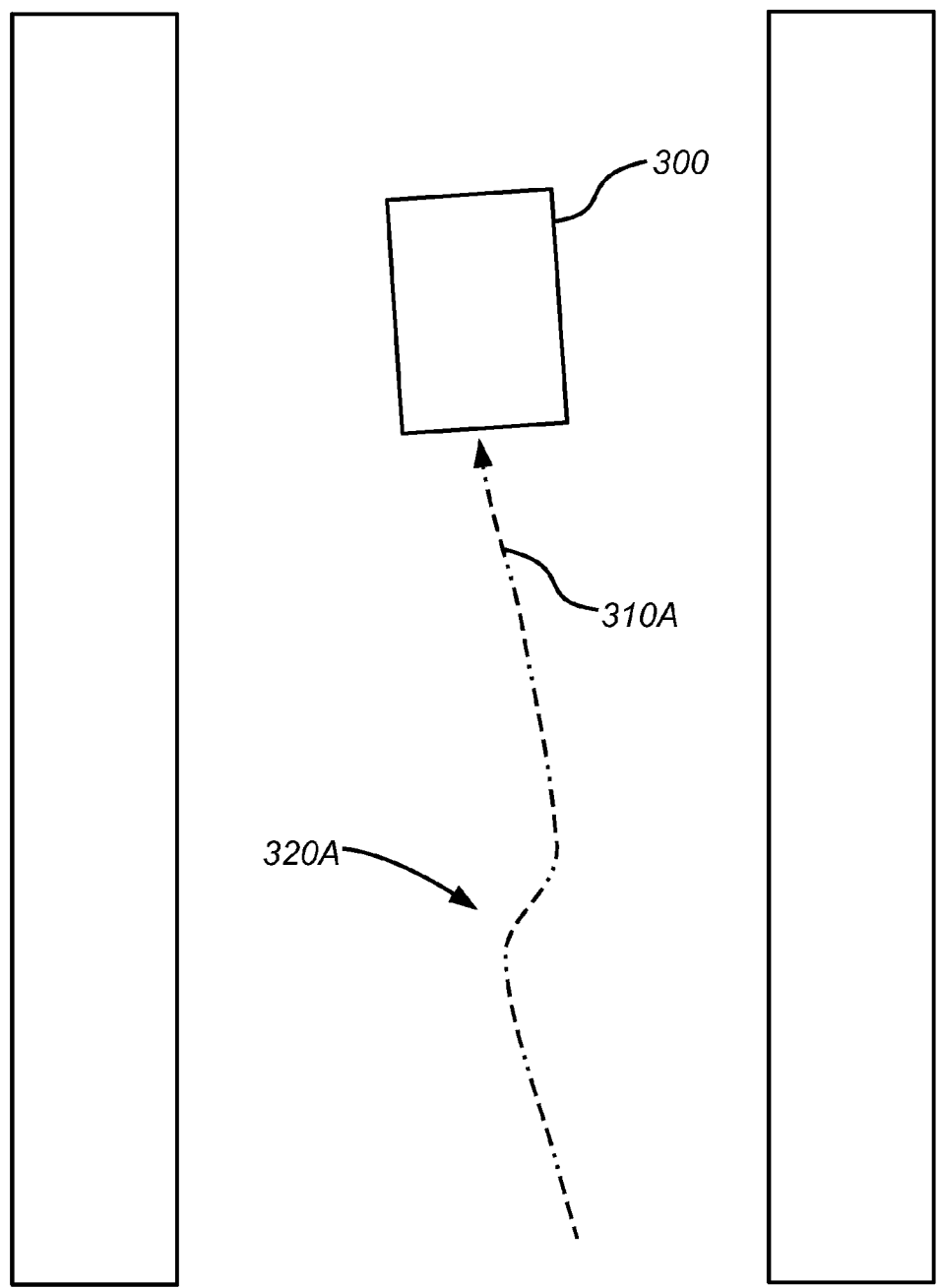
FIGS. 3A-3B are overhead illustrations of problematic cart movement patterns that are symptomatic of damaged or defective wheels.

Referring now to FIG. 3A, various movement patterns by a cart 300 may evince a defective wheel. For example, a cart 300 with a defective wheel may veer in one direction or favor that direction. Image processing module 120 is adapted to track a path 310A followed by cart 300. A customer pushing the cart 300 may occasionally notice that the cart 300 has not maintained the desired direction and may occasionally make a corresponding course correction 320A. Such a course correction 320A may indicate to image processing module 120 that the cart 300 has a defective or damaged wheel. Alternatively, image processing module 120 can detect if a cart 300 persistently veers to one side and therefore ascertain that the cart 300 may have a defective wheel.

Figure 3B:
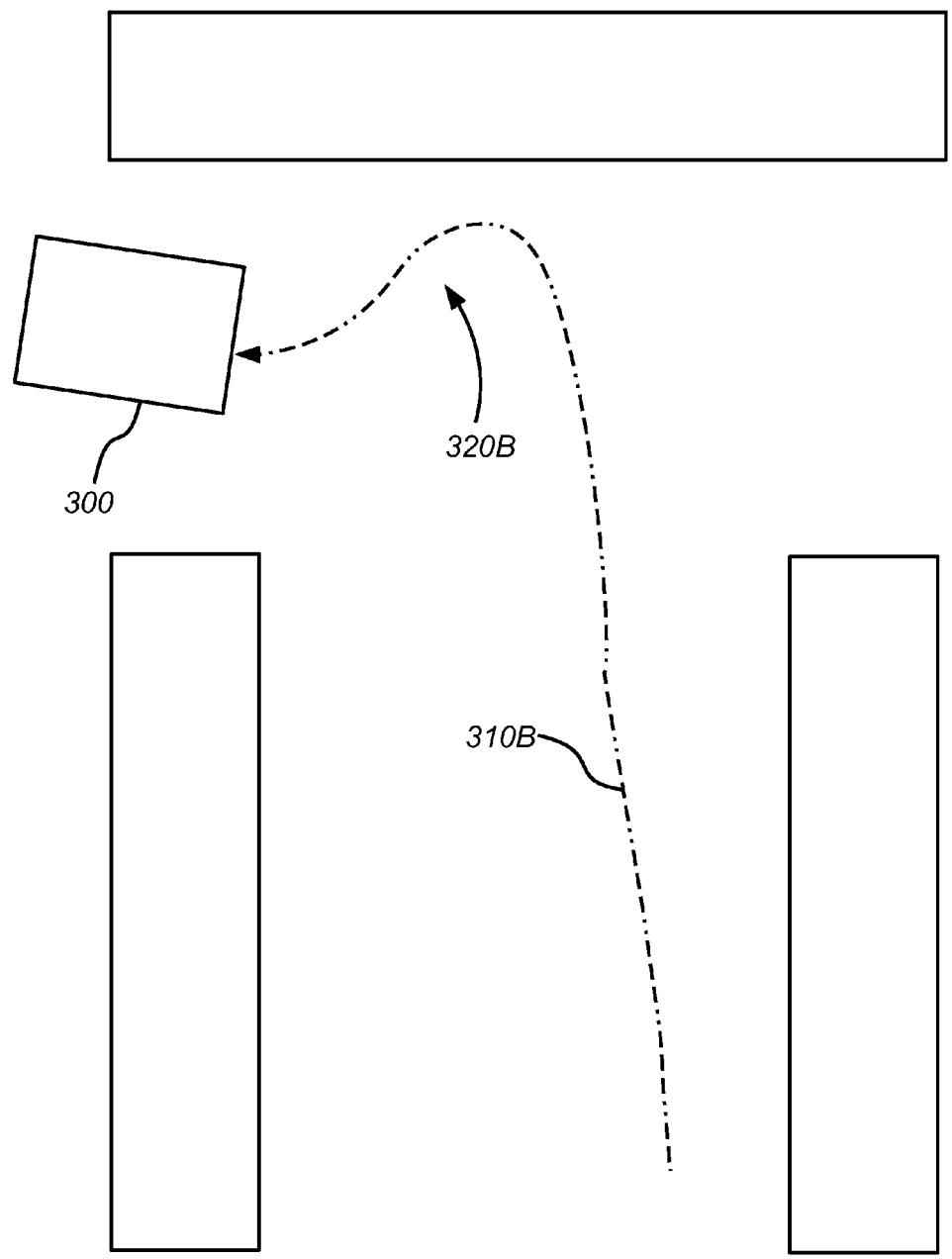

Referring now to FIG. 3B, a defective or damaged wheel may increase the cornering difficulty of the cart 300. Thus, a problematic cart may be one that has a wider turning radius than is typical for that model and/or size of cart. Accordingly, image processing module 120 may track path 310B of a cart 300 and analyze the cart's 300 turning radius as the customer pushes it around corners. A customer may make a wider turn than is typical, followed by a corresponding course correction as depicted at 320B. Such wide turns and corrections 320B may indicate to image processing module 120 that the cart 300 has a defective or damaged wheel. Alternatively, if the cart 300 exhibits a tendency to consistently make wider turns when turning toward one direction than when turning the other, image processing module 120 may ascertain that the cart 300 has a damaged or defective wheel.

Course deviations and corresponding corrections may be more likely to occur during an early phase of a shopping trip before the customer has acclimated to the problematic cart's idiosyncrasies. Accordingly, embodiments of the present disclosure comprise an image processing module 120 adapted to particularly focus on a shopping cart's movement patterns soon after a customer begins using that shopping cart.

Cart abandonment by a customer during a shopping trip may indicate that the cart has a damaged or defective wheel. A customer may begin using a cart shortly before or after entering a store and soon thereafter discover that the cart is damaged or defective. Upon realizing that the cart is problematic, the customer may leave the cart and retrieve another cart or complete the shopping trip without a cart. An abandoned cart may remain where the customer left it until a store associate retrieves it or another customer begins using it. Until then, an abandoned cart could pose a hazard or nuisance to other customers. If a second customer finds and begins using an abandoned problematic cart, the second customer may experience the same negative effects from the damaged or defective cart. Accordingly, in embodiments, image processing module 120 is adapted to identify if a cart has been abandoned. Image processing module 120 can identify a person pushing a cart and associate that person with the cart. If the person leaves the cart for a certain amount of time or moves a certain distance from the cart, image processing module 120 may ascertain that the person has abandoned the cart. The specific time and distance thresholds may be dependent on local factors, such as the type of retail establishment and size of the building. The time and distance thresholds may be sufficiently large to account for customers that leave a cart while searching out items but with the intent to continue to use the cart.

Alternatively, if the person begins using a second cart after leaving the first cart, image processing module 120 may ascertain that the person has abandoned the first cart. In other embodiments, image processing module 120 can use image recognition techniques to identify if any objects are in a cart. If a customer leaves such objects in a cart, then it may be presumed that the customer intends to return to the cart to continue shopping with it. Conversely, if a customer removes all or most items from a cart, then the cart may be identified as abandoned.

Embodiments of the present disclosure analyze the position of a cart's swiveling wheels to determine if the wheels are damaged or defective. In one embodiment, image processing module 120 analyzes captured images or video to determine the orientation of the swiveling wheels in relation to each other. Image processing module 120 may further analyze the swiveling wheels' orientation in relation to the cart's direction. If the swiveling wheels do not maintain an expected level of coordination to each other and/or the cart, image processing module 120 may ascertain that the cart 300 has a damaged or defective wheel.

Embodiments of the present disclosure are adapted to analyze carts to identify sustained oscillation of the swiveling wheels (also known as wheel wobble). In an embodiment, image processing module 120 analyzes a video feed of the cart to determine a wheel's oscillation frequency. If the observed frequency is over a predetermined threshold, an alert may be created to replace and/or repair the cart wheel.

Additional parameters could include oscillation duration; for example: an alert is created if the swiveling wheel exhibits sustained wobble for at least four seconds. Alternative thresholds may be selected as desired. Wheel wobble may occur at specific frequencies that are dependent, among other things, on the cart's characteristics and forward velocity. Accordingly, in an embodiment, image processing module 120 determines the cart's velocity and calculates an expected wheel wobble frequency range for the cart for that velocity. Image processing module 120 may then analyze a video feed of the cart to determine the wheels' oscillation frequency and create an alert if appropriate.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A computer-implemented method of detecting a faulty wheel, comprising:
   receiving, at an image processing module, an image sequence depicting a cart having the faulty wheel, wherein the faulty wheel exhibits one of a swiveling resistance and a wobble;
   detecting, by the image processing module, that the cart has the faulty wheel;
   wherein detecting, by the image processing module, that the cart has the faulty wheel further comprises identifying, by the image processing module, the cart as an abandoned cart; and
   transmitting an alert regarding the abandoned cart.

2. The method of claim 1, wherein identifying, by the image processing module, the cart as an abandoned cart comprises identifying a person associated with the cart.

3. The method of claim 2, further comprising tracking, by the image processing module, the person's movement.

4. The method of claim 3, wherein identifying, by the image processing module, the cart as an abandoned cart further comprises:
   selectively establishing an abandonment time threshold and determining, by the image processing module, if the person leaves the cart for longer than the abandonment time threshold.

5. The method of claim 3, wherein identifying, by the image processing module, the cart as an abandoned cart further comprises:
   selectively establishing an abandonment distance threshold; and
   determining, by the image processing module, if the person moves away from the cart farther than the abandonment distance threshold.

6. The method of claim 1, further comprising:
   identifying, by the image processing module, an item in the cart;
   visually tracking, by the image processing module, the item as the customer removes the item from the cart; and
   verifying, by the image processing module, that the cart contains no items.

7. The method of claim 6, further comprising verifying, by the image processing module, that the customer has placed the item into a replacement cart.

8. The method of claim 1, wherein transmitting an alert regarding the abandoned cart comprises transmitting a signal to a mobile computing device.

9. The method of claim 1, wherein transmitting an alert regarding the abandoned cart comprises transmitting a request to remove the cart from use.

10. A system for detecting a faulty wheel, comprising:
    a camera;
    an image processing module comprising one or more image processing processors and one or more image processing memory devices operably coupled to the one or more image processing processors and storing executable and operational image processing data, the executable and operational image processing data effective to cause the one or more image processing processors to:
      analyze a sequence of images captured by the camera to track a movement pattern of a cart having the faulty wheel, wherein the faulty wheel exhibits one of a swiveling resistance and a wobble; and
      detect that the cart has the faulty wheel by identifying that the cart is abandoned; and
    an application server comprising one or more application server processors and one or more application server memory devices operably coupled to the one or more application server processors and storing executable and operational application server data, the executable and operational application server data effective to cause the one or more application server processors to create an alert if the image processing module detected that the cart is abandoned.

11. The system of claim 10, wherein the executable and operational image processing data is effective to further cause the one or more image processing processors to analyze the sequence of images to identify a person using the cart.

12. The system of claim 10, further comprising computer-readable instructions stored in a memory of a mobile computing device.

13. The system of claim 12, wherein the computer-readable instructions stored in a memory of a mobile computing device are adapted to display the alert on the mobile computing device.

14. The system of claim 10, wherein the executable and operational image processing data is effective to further cause the one or more image processing processors to verify that a customer previously moved at least one item from the cart into a replacement cart.

15. A computer-implemented method of detecting a faulty wheel, comprising:
    receiving, at an image processing module, an image sequence depicting a cart having the faulty wheel exhibiting one of a swiveling resistance and a wobble;
    verifying, by the image processing module, that the cart contains no items;
    detecting, by the image processing module, that the cart has the faulty wheel;
    wherein detecting, by the image processing module, that the cart has the faulty wheel further comprises identifying, by the image processing module, the cart as an abandoned cart; and
    transmitting an alert regarding the abandoned cart.

16. The method of claim 15, wherein transmitting an alert regarding the abandoned cart comprises transmitting a signal to a mobile computing device.

17. The method of claim 15, further comprising verifying, by the image processing module, that a customer previously moved at least one item from the cart into a replacement cart.

* * * * *